United States Patent [19]

Neeman

[11] Patent Number: 4,966,328

[45] Date of Patent: Oct. 30, 1990

[54] MICROSPRAYERS FOR USE IN IRRIGATION

[75] Inventor: Avraham Neeman, Karkur, Israel

[73] Assignee: Dan Mamtirim, Galil Elyon, Israel

[21] Appl. No.: 426,354

[22] Filed: Oct. 25, 1989

[30] Foreign Application Priority Data

Aug. 28, 1989 [IL] Israel ........................................ 91450

[51] Int. Cl.[5] .......................... B05B 1/26; B05B 1/30; A01G 25/16

[52] U.S. Cl. ................................. 239/524; 239/533.1; 239/570; 239/276

[58] Field of Search ...................... 239/276, 533.1, 570, 239/518, 524, 498

[56] References Cited

U.S. PATENT DOCUMENTS 1,427,822 9/1922 Kennedy et al. ................... 239/518

4,231,523 11/1980 Vikre ................................ 239/533.1

FOREIGN PATENT DOCUMENTS 2612044 9/1988 France ............................. 239/533.1

*Primary Examiner*—Andres Kashnikow

*Assistant Examiner*—Karen B. Merritt

*Attorney, Agent, or Firm*—Browdy and Neimark

[57] ABSTRACT

A microsprayer producing a pressure compensating jet is disclosed comprising a substantially cylindrical housing open at a first end thereof and having a spray directing boss formed integrally therewith and adjacent to a second and opposite end thereof; and an insert body adapted to be press fitted within the housing and comprising a longitudinally directed wall portion, first and second flanges extending respectively from opposite sides of the wall portion so as to bear sealingly against an inner surface of the housing so as to define therewith respective inlet and outlet chambers. A flexible membrane is located in the inlet chamber so as to divide it into first and second sub-chambers and a water inlet means is formed in a first end wall of the insert body adjacent the first end of the housing and communicating with the first sub-chamber. A communicating aperture formed in the wall portion serves to effect communication between the second sub-chamber and the outlet chamber, there being a second end wall of the insert body adjacent the second end of the housing and formed with a spray outlet aligned with and adjacent to the spray directing boss.

4 Claims, 2 Drawing Sheets

MICROSPRAYERS FOR USE IN IRRIGATION

FIELD OF THE INVENTION

This invention relates to microsprayers for use in irrigation.

BACKGROUND OF THE INVENTION

Microsprayers for use in irrigation have been known for some time and their increasing use has directed attention to the desirability of reducing the cost of production. In particular, the use of conventional moulding techniques in producing such microsprayers has focused attention on the desirability of producing them with a minimum number of separate components which are then to be assembled. This is particularly the case when it is desired to produce pressure compensating microsprayers whose output remains substantially invariant regardless of pressure variations in the mains input pressure.

BRIEF SUMMARY OF THE INVENTION

It is an object of the present invention to provide a new and improved pressure compensating microsprayer consisting of a minimum number of separate parts.

According to the present invention, there is provided a microsprayer comprising in combination a substantially cylindrical housing open at a first end thereof and having a spray directing boss formed integrally therewith and adjacent to a second and opposite end thereof; an insert body adapted to be press fitted within said housing and comprising a longitudinally directed wall portion, first and second flanges extending respectively from opposite sides of said wall portion so as to bear sealingly against an inner surface of said housing so as to define therewith respective inlet and outlet chambers;

a flexible membrane so located in said inlet chamber as to divide it into first and second sub-chambers;

water inlet means formed in a first end wall of said insert body adjacent said first end of the housing and communicating with said first sub-chamber;

a communicating aperture formed in said wall portion and serving to effect communication between said second sub-chamber and said outlet chamber; and a second end wall of said insert body adjacent said second end of said housing and formed with a spray outlet aligned with and adjacent to said spray directing boss.

Thus, by virtue of the construction of the microsprayer in accordance with the invention, and the fact that the spray directing boss is formed integrally with the housing, the microsprayer consists essentially of two moulded parts which, together with the flexible membrane, can be readily assembled.

BRIEF SUMMARY OF THE DRAWINGS

For a better understanding of the present invention and to show how the same may be carried out in practice, reference will now be made to the accompanying drawings, in which.

DETAILED DESCRIPTION OF A PREFERRED EMBODIMENT

Figure 2:
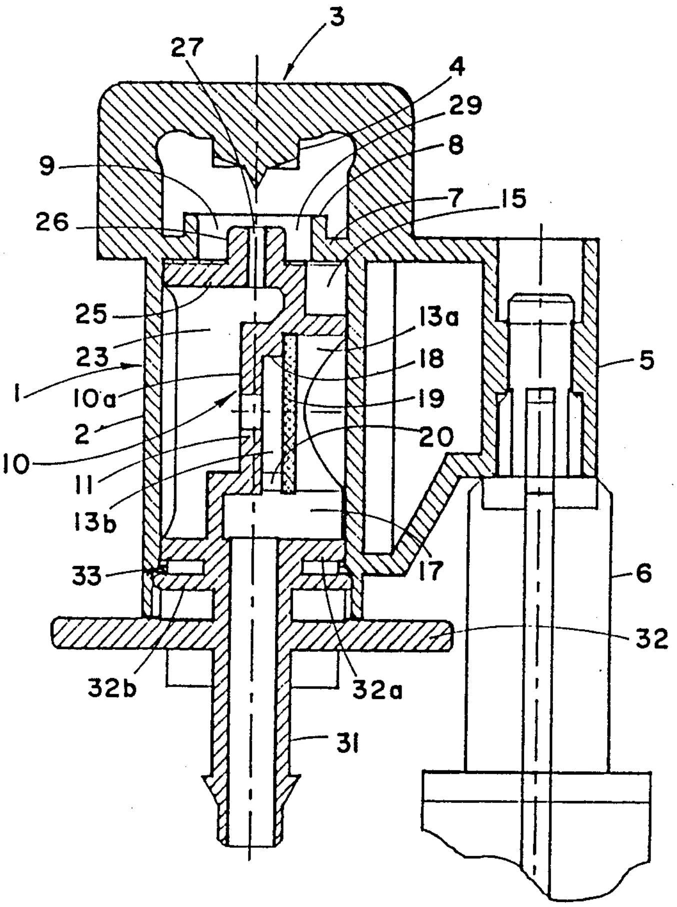
FIG. 2 is a longitudinally sectioned view of the microsprayer shown in FIG. 1, taken along the line II—II.
Figure 1:
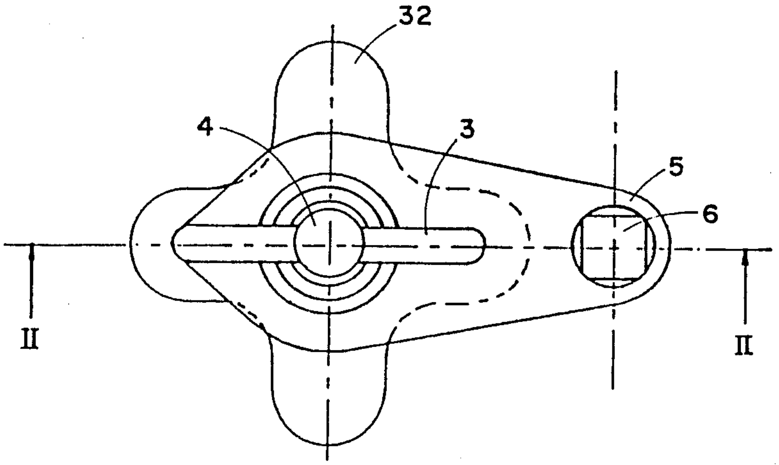
FIG. 1 is a plan view from above of a microsprayer in accordance with the invention.

As seen in the drawings, a microsprayer comprises an external casing 1 consisting of a cylindrical housing 2 formed integrally with a U-shaped bridging element 3 having a downwardly depending, spray diverting boss 4. The casing 1 is formed integrally with a tubular leg support 5 into which is adapted to project and be retained, a sprayer supporting leg 6. The upper end of the housing 2 is formed with an inwardly directed flange 7 formed integrally with an upwardly directed bounding rim 8 which defines a central aperture 9.

Figure 3:
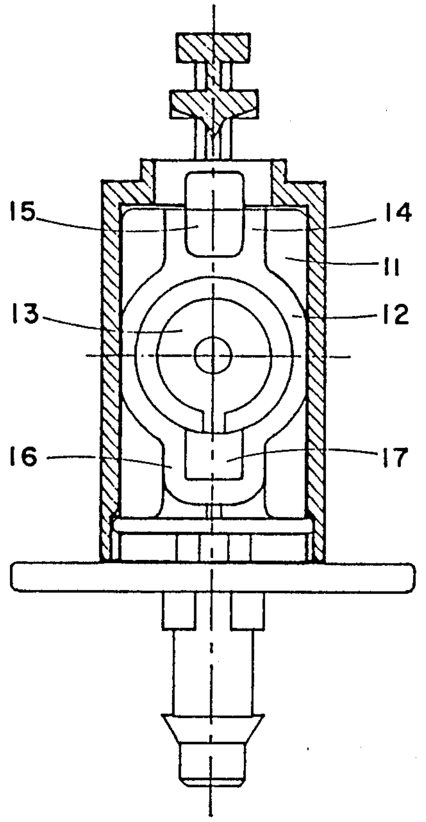
FIG. 3 is a side elevation of the microsprayer shown in FIG. 1, with an external casing thereof longitudinally sectioned.

An insert body 10 designed to be press fitted within the housing 2 is formed with a central partition wall 11 (clearly seen in FIG. 3 of the drawings) from one side of which there extends laterally an annular flange 12 which defines, with the wall 11, a water inlet chamber 13. Formed integrally with the annular rim 12 is an upper, U-shaped flange 14 which defines with the central wall 11 a U-shaped recess 15. The annular flange 12 is furthermore formed integrally with a lower U-shaped flange 16 which defines a U-shaped recess 17 which is closed at its lower end by the flange 16 and communicates at its upper end with the inlet chamber 13. Formed integrally with a base wall portion **10*a* of the inlet chamber 13 is a peripheral rim 18 against which is supported a flexible membrane 19, the rim 18 being formed with a slit 20 which communicates with the recess 17. A circular, flexible membrane 19 bears against the rim 18 and serves to divide the inlet chamber 13 into sub-chambers 13*a* and 13*b*. The sub-chamber 13*a* is effectively defined between the inner wall surface of the housing 2, the inner wall surfaces of the annular flange 12 and the wall surface of the membrane 19**.

Figure 4:
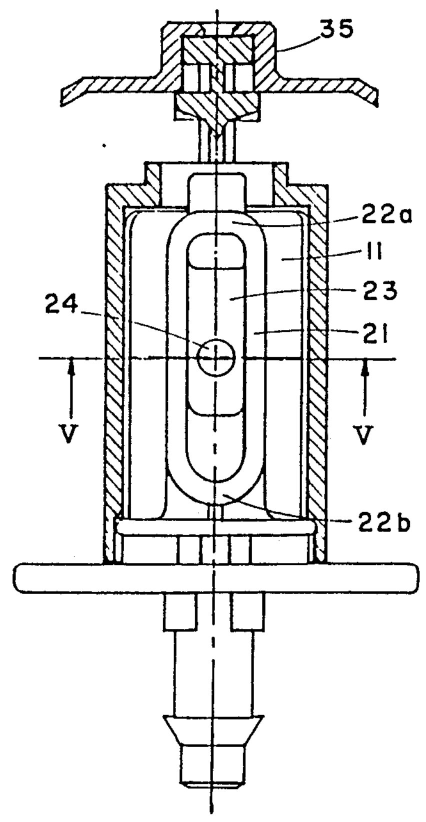
FIG. 4 is a second and opposite side elevation of the microsprayer shown in FIG. 1, with the external casing thereof longitudinally sectioned.
Figure 5:
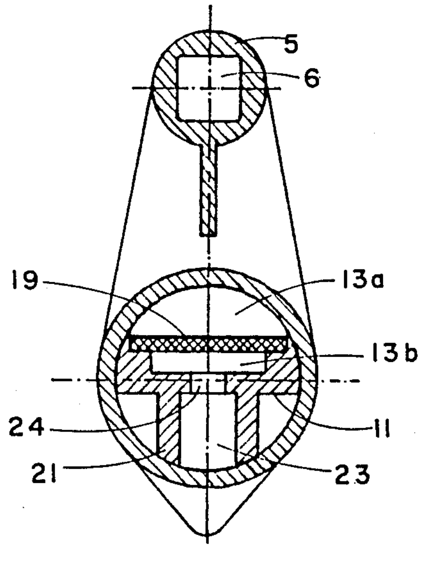
FIG. 5 is a cross-sectional view of the microsprayer shown in FIG. 4, along the lines V—V.

As seen clearly in FIG. 4 of the drawings, there extends from an opposite surface of the wall 11 a substantially rounded upper and lower end portions **22*a* and 22*b*. The flange 21 sealingly fits against the inner surface of the housing 2 and defines therewith an outlet chamber 23 which communicates with the sub-chamber 13*b* via an outlet aperture 24 formed in the wall 11**.

An upper end wall 25 of the insert body 10 is formed integrally with an upwardly directed outlet boss 26 in which is formed a central, through-going bore 27 which communicates with the interior of the outlet chamber 23. In the assembled state, the upper edge of the boss 26 is located slightly below the uppermost edge of the rim 8 and so there is defined between the boss 26 and the rim 8 an annular well 29 which communicates with the recessed portion 15.

The insert 10 is formed integrally with a water inlet nipple 31 from which there extends radially and integrally a wing-shaped portion 32 and, axially spaced therefrom, a double sealing flange **32*a* and 32*b*. The outermost edges of the double sealing flange 32*a* and 32*b* bear sealingly against the inner surface of the housing 2 and have located between them a sealing ring 33**.

With the microsprayer assembled as shown in the drawings, water flowing thereinto via the inlet nipple 31 passes through the recess 17 into both of the sub-chambers 13*a* and 13*b* and, by virtue of the differential pressure control exerted by the membrane 19, emerges from the outlet aperture 24 into the outlet chamber 23 at a substantially constant pressure. The water then flows from the chamber 23 through the sprayer outlet 27 so as to strike the diverting boss 4 which is thereby effective in creating a uniform circular spray around the sprayer.

The provision of the double sealing flanges 32*a* and 32*b* and the interposed sealing ring 33 ensures that any water which may have leaked around the sealing edges of the flanges 12 and 21 and accumulates within the housing 2 does not leak away from the microsprayer in a downward direction. This accumulated water passes into the well 9 and is entrained with the outflowing water jet emerging from the aperture 27.

The particular construction of the microsprayer in accordance with the invention, and in particular the location of the inlet and outlet chambers and the fact that the differential pressure controlling membrane is located in a plane substantially parallel with the direction of flow of the water from the inlet nipple 31 to the spray outlet 27, ensure that the sprayer can be formed of two plastic components and that the external casing can be moulded directly with the spray diverting boss 4 using conventional moulding techniques and thereby considrably economising moulding costs.

As seen in FIG. 4 of the drawings, a range limiting cap can be fitted onto the web portion of the bridge member 3 and is thereby effective in limiting the range of the emitted spray.

I claim:

1. A microsprayer comprising in combination a substantially cylindrical housing open at a first end thereof and having a spray directing boss formed integrally therewith and adjacent to a second and opposite end thereof; an insert body adapted to be press fitted within said housing and comprising a longitudinally directed wall portion, first and second flanges extending respectively from opposite sides of said wall portion so as to bear sealingly against an inner surface of said housing so as to define therewith respective inlet and outlet chambers;

a flexible membrane so located in said inlet chamber as to divide it into first and second sub-chambers;

water inlet means formed in a first end wall of said insert body adjacent said first end of the housing and communicating with said first sub-chamber;

a communicating aperture formed in said wall portion and serving to effect communication between said second sub-chamber and said outlet chamber; and a second end wall of said insert body adjacent said second end of said housing and formed with a spray outlet aligned with and adjacent to said spray directing boss.

2. A microsprayer according to claim 1 wherein said spray diverting boss is formed integrally with a web portion of a U-shaped bridging element which is integrally coupled to said housing via leg portions thereof.

3. A microsprayer according to claim 1 wherein said second end of said housing is formed with an inwardly directed flange and wherein the spray outlet is formed in an outlet boss formed integrally with said second end wall of said insert body, said inwardly directed flange defining with said outlet boss a well whereby water accumulating therein is entrained with water emerging from said outlet.

4. A microsprayer according to claim 1 wherein said first end wall of said insert body comprises a pair of laterally extending flanges whose edges bear sealingly against the inner surface of said housing and wherein additional sealing means is interposed between the edges of said flanges.

* * * * *